US007142120B2

United States Patent
Charych et al.

(10) Patent No.: US 7,142,120 B2
(45) Date of Patent: Nov. 28, 2006

(54) ITEM FINDING USING RF SIGNALLING

(75) Inventors: Hal Charych, Poquott, NY (US); Raj Bridgelall, Mount Sinai, NY (US); Sumita Malik, Delhi (IN); Michael O'Haire, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 225 days.

(21) Appl. No.: 10/881,020

(22) Filed: Jun. 29, 2004

(65) Prior Publication Data

US 2005/0285742 A1  Dec. 29, 2005

(51) Int. Cl.
*G08B 13/14* (2006.01)

(52) U.S. Cl. .................. 340/572.4; 235/385; 340/10.1; 340/326; 340/505; 340/539.21; 340/539.32; 340/691.3; 340/691.5

(58) Field of Classification Search ............... 340/10.1, 340/825.49, 572.4, 572.1, 505, 539.32, 539.21, 340/326, 691.3–691.6; 235/385; 705/28; 342/118, 147, 385, 450, 458, 463
See application file for complete search history.

(56) References Cited

U.S. PATENT DOCUMENTS

| 5,528,232 | A | * | 6/1996 | Verma et al. ........... 340/825.49 |
| 5,565,858 | A | * | 10/1996 | Guthrie ..................... 340/10.1 |
| 5,963,134 | A | * | 10/1999 | Bowers et al. ............. 340/10.1 |
| 6,232,870 | B1 | * | 5/2001 | Garber et al. .............. 340/10.1 |
| 2003/0034887 | A1 | * | 2/2003 | Crabtree et al. .......... 340/573.1 |
| 2003/0141973 | A1 | * | 7/2003 | Yeh et al. .............. 340/539.13 |
| 2004/0217859 | A1 | * | 11/2004 | Pucci et al. ............ 340/539.32 |

* cited by examiner

*Primary Examiner*—Thomas Mullen
(74) *Attorney, Agent, or Firm*—Ingrassia Fisher & Lorenz P.C.

(57) ABSTRACT

Methods and apparatus are provided for locating one among many items equipped with RFID tags. The apparatus comprises a portable system interrogating the RFID tags and receiving responses therefrom that depend at least on their bearing angle. A comparator selects responses from the one item and ignores others. An annunciator indicates the presence of the one item in the interrogator field of view and, desirably but not essentially, its relative proximity. A directional antenna whose beam pattern is limited in azimuth and/or elevation provides bearing angle information. Its field of view becomes progressively smaller as the antenna approaches the one item so that a user can substantially pinpoint its location without needing any of the usual RFID infrastructure. Tag response hit rate and/or signal strength provides range related information to the interrogator. Optionally, the presence of each new tag is announced until all new tags have been identified.

25 Claims, 6 Drawing Sheets

ITEM FINDING USING RF SIGNALLING

TECHNICAL FIELD

The present invention generally relates to remotely identifying and locating objects, and more particularly relates to remotely identifying and locating objects using RF signaling.

BACKGROUND

There are many applications today where it is desired to sense the presence and location of a specific object, as for example, a package stored in a warehouse or on a pallet or in a shipping container. For example, a warehouse attendant or shipping clerk may need to determine whether a particular package or item is present and where it is located. When there are many packages or items that are similar in appearance this can be a daunting and very time consuming task. Ordinarily, the attendant would have to examine the label on every package or item looking for the desired item or package. The advent of bar-code identification has somewhat simplified such tasks, but suffers from the limitation that each bar code label must be located and physically scanned at close range by a bar code reader. Every item or package in the pile may have to be scanned before the user can even be sure whether or not the desired package or item is or is not present. This can be extremely time consuming and inefficient.

Radio frequency identification (RFID) tags are now in common use with many goods or items. An RFID tag is an electronic device attached to an item or package and contains a unique identifier (e.g., an ID number) that can be read remotely using a radio frequency (RF) signal. When the RFID tag is interrogated by an RFID tag reader, the tag responds with at least its unique identifier. Many different types of RFID tags are now in use. For example, and not intended to be limiting: (i) some tags are substantially passive, that is, they don't emit a signal but their presence in the antenna field of the interrogator dynamically alters the impedance of the interrogator's RF antenna allowing their presence to be detected; (ii) some are semi-passive, that is, they receive a signal from the interrogator on a first frequency and use the received energy to reply on a second frequency; and (iii) some are active, that is, they have an on-board power source for the tag circuit, which is turned on by the interrogation signal so that the tag can broadcast a response. Any of these and other types of tags can be used with the present invention provided that the RFID interrogator can determine the unique tag identifiers. The tag identifier is therefore associated with the item to which the tag is attached. When the tags are within radio frequency (RF) signaling distance of the interrogator they respond. If the unique identifier (e.g., the ID number) of the desired item is among those scanned by the interrogator, then the user will know that it is present within the signaling range of the RFID interrogator, but may still not know its exact location. If the warehouse or other storage location is equipped with tag range measuring infrastructure, then the infrastructure system may also be able to determine the location of the tagged object or package. However, not all package or item storage locations have such infrastructure. So, a need continues to exist for a means and method that will determine the presence and location of a particular item or package without such RFID ranging infrastructure.

Accordingly, it is desirable to provide an improved means and method for remotely determining the presence and position of tagged items or packages. It is desirable that such system and method be capable of working with the many types of RFID tags that already exist. In addition, it is desirable that such system and method be simple, rugged and reliable. It is further desirable that such system and method not require fixed infrastructure but be portable and self-contained so that it can be used anywhere. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for locating a particular item from among many items. The apparatus comprises a portable communication system employing a directional antenna for interrogating the many items and receiving individual responses therefrom that depend upon whether they are within the beam pattern of the directional antenna. A comparator is coupled to the communication system for comparing the identifiers in the received responses with a unique identifier for the particular item. The tag's response is also desirably analyzed to determine proximity information, but this is not essential. An annunciator is coupled to the communication system and the comparator for indicating relative proximity and angle of bearing of the item having the desired identifier. In a further embodiment, the apparatus gives a signal to the user when each new item is identified. The new item signal stops when all new items in the field of view have been identified. The apparatus optionally sends the unique identifiers so identified to a base station.

A method is provided for locating a particular item from among a plurality of items, using an RFID tag interrogator in a find mode, wherein each item has an RFID tag containing a unique identifier. The method comprises obtaining and storing the unique identifier for the particular item desired to be located, interrogating the plurality of items to determine their unique identifiers, comparing the unique identifiers thereby obtained to the unique identifier for the particular item stored in memory and, if there is a match, presenting relative position dependant data for the tag having the unique identifier for the particular item, to a user, and repeating the interrogating, comparing steps and presenting steps for different locations of the interrogator, thereby obtaining position dependant data pointing to the particular item. In a further embodiment in a search mode, all tags in the field of view are read and for each newly detected tag a signal is presented to the user and the unique identifier of each newly detected tag is, optionally, sent to a bases station. When all new tags have been identified, the signal to the user stops indicating that no new tags remain in the field of view. In a further embodiment, if a desired tag identifier has already been entered, the method then switches to the find mode already described.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1A:
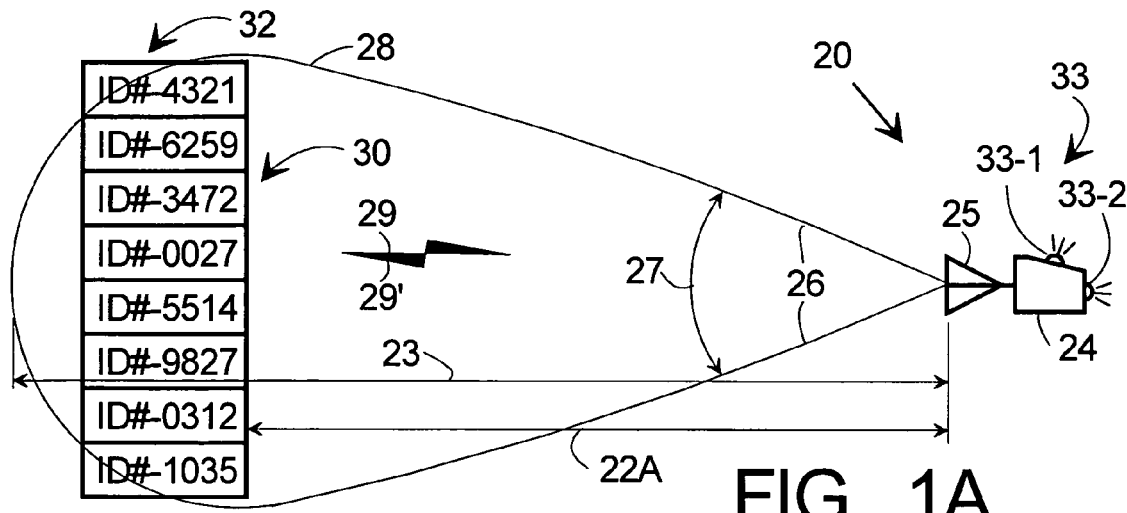
FIGS. 1A–C are simplified side views of the item identification and locator system of the present invention for three different locator-item separations.
Figure 1B:
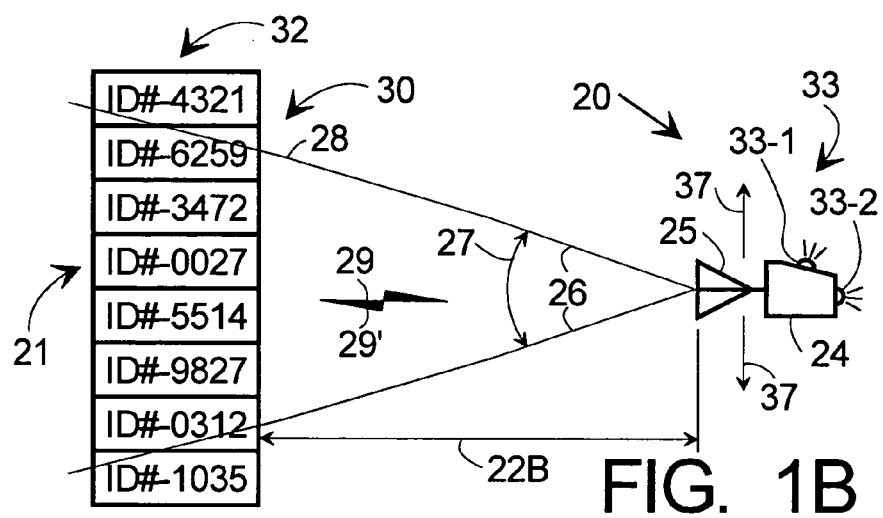
Figure 1C:
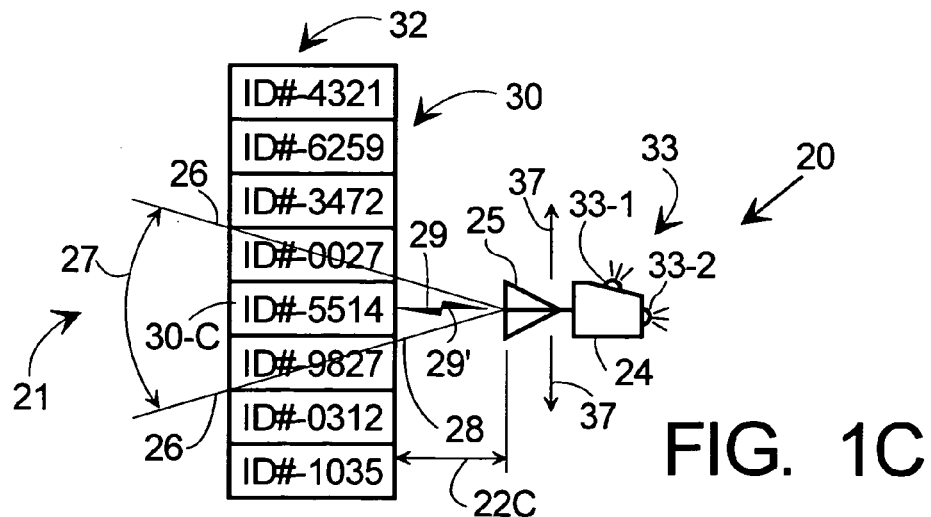
Figure 1D:
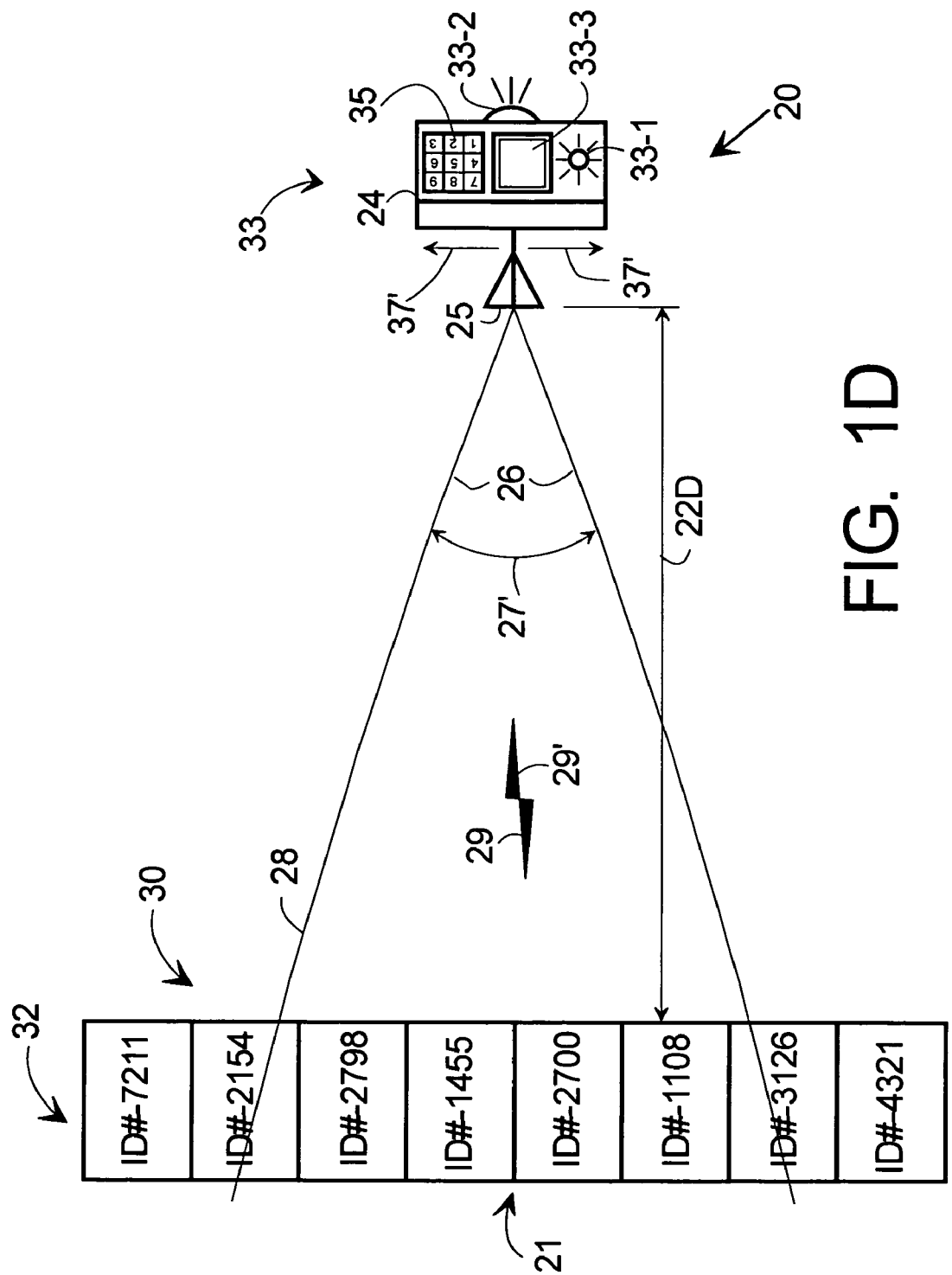
FIG. 1D is a plan or top view of the system of FIGS. 1A–C showing further details.

FIGS. 1A–C are simplified side views of item identification and locator system 20 of the present invention, interacting with items 30 having thereon RFID tags 32, for three different locator-item separations 22A, 22B, 22C. FIG. 1D is a plan or top view of system 20 interacting with the same items and tags at locator-item separation 22D. Persons of skill in the art will understand that FIGS. 1A–C are two dimensional side views and FIG. 1D is a two-dimensional top view of, in this example, a three-dimensional pile of objects or items 30 and associated RFID tags 32. System 20 comprises RF interrogator 24 with associated antenna 25 and annunciator 33. Annunciator 33 can include one or both of visual indicator 33-1 and audible indicator 33-2 to alert the user when a desired object is detected. The details of interrogator 24 and associated annunciator 33 are explained more fully in connection with FIG. 2. A suitable antenna is described in commonly owned, co-pending application entitled "Directional Antenna Array" Ser. No. 10/661,652 filed Sep. 12, 2003.

Interrogator 24 transmits via antenna 25, RF signal 29 directed toward objects 30 and associated tags 32 and receives signal 29' in response. In this example, it is assumed merely for convenience of description that transmission signal 29 and reception signals 29' are both handled by antenna 25, but this is not essential and not intended to be limiting. Separate transmit and receive antennas can also be used (e.g., see FIG. 2). Signal 29 is localized and desirably has approximately cone-shaped RF beam or pattern 26 with outer perimeter 28. RF beam or pattern 26 has vertical angle or extent 27 (see FIGS. 1A–C) and azimuthal angle or extent 27' (see FIG. 1D). Three-dimensional perimeter 28 of RF beam or pattern 26 substantially defines the spatial boundary within which interrogator 24 can detect the presence of an RFID tag and determine its unique identifier. For convenience of description it is assumed that the unique identifier is a number, that is, a unique series of digits (abbreviated as ID # or ID # XXXX). However, this is not intended to be limiting and persons of skill in the art will understand that the unique identifier can be any combination of alpha-numeric, binary, or other characters in any convenient representation system, of which decimal, hexi-decimal, binary, etc., are non-limiting examples. Also, while RF beam pattern 26 of perimeter 28 is illustrated herein as being approximately cone-shaped, this is merely for convenience of explanation and is not essential, and any spatially limited antenna pattern may be used. As used herein, the words "RF beam pattern" are intended to include an RF radiation/reception pattern of any shape, that is spatially limited in azimuth or elevation or, preferably both. Further, beam pattern 26 of perimeter 28 is not limited merely to transmitted signal 29 but can also apply to received signal 29' or both, since it is generally a property of most antennas that their transmit and received signal beam patterns have about the same spatially limited shape, albeit of different size depending upon the interrogator's sensitivity.

For item-interrogator separations 22 that are within the sensitivity range of the interrogator, it is desirable that beam pattern 26 have approximately constant angular aperture 27, 27' so that the number of items being exposed to beam pattern 26 varies with item-interrogator separation or range 22. For example, in FIG. 1A, separation distance 22A is sufficiently large that beam pattern 26 of perimeter 28 includes substantially all of items 30 (and associated tags 32), e.g., items have ID #'s 4321, 6259, 3472, 0027, 5514, 9827, 0312, and 1035. In FIG. 1B, separation distance 22B is smaller and beam pattern 26 covers only some of items 30, for example, items with ID #'s 3472, 0027, 5514 and 9827. In FIG. 1D separation distance or range 22D is such that beam pattern 26 covers, for example, items with ID #'s 2798, 1455, 2700, and 1108. In FIG. 1C, separation distance 22C is even smaller and beam pattern 26 covers, substantially, only item 30-C with ID # 5514. Annunciator 33 desirably gives an audio and/or visual indication whenever interrogator 24 receives a return signal corresponding to the item being sought. By scanning the interrogator back and forth while approaching a pile of objects, the user can narrow the field of search to particularly locate the desired object.

Beam pattern 26 is spatially limited, not only in elevation and azimuth but also in distance 23 from interrogator 24. Beyond perimeter 28 of beam pattern 26, the transmit and/or receive signal strength drop off such that detection of an RF tag is unlikely. Thus, perimeter 28 of beam pattern 26 can be thought of as defining the "field of view" of interrogator 24. If item or object 30 lies within field of view 28, then its on-board RFID tag can be irradiated by interrogator 24 with sufficient signal strength that the RFID tag response can detected by interrogator 24 and indication thereof given by annunciator 33. Thus, an item or object 30 in this field of view can in effect be "seen" by interrogator 24. Because field of view 28 is spatially limited, it can be used in cooperation with interrogator 24 to determine the location of a particular item or object. By 'scanning' interrogator 24 as shown by arrows 37, 37', different portions of objects 30 can be brought into the field of view of interrogator 24. This provides angle of bearing information about the location of the particular item being sought. As the user moves interrogator 24 closer and closer to objects or items 30, portion 21 of overall field of view 28 of interrogator 24 intersecting objects 30 narrows in three dimensions so that fewer and fewer of objects or items 30 are effectively within field of view portion 21. By scanning the interrogator back and forth while approaching a pile of objects, the user can narrow the field of search to particularly locate the desired object. No tag ranging infrastructure is required. However, the task of locating a particular object is made easier by taking advantage of range information that is inherent in signal 29' being returned from the tag.

Figure 2:
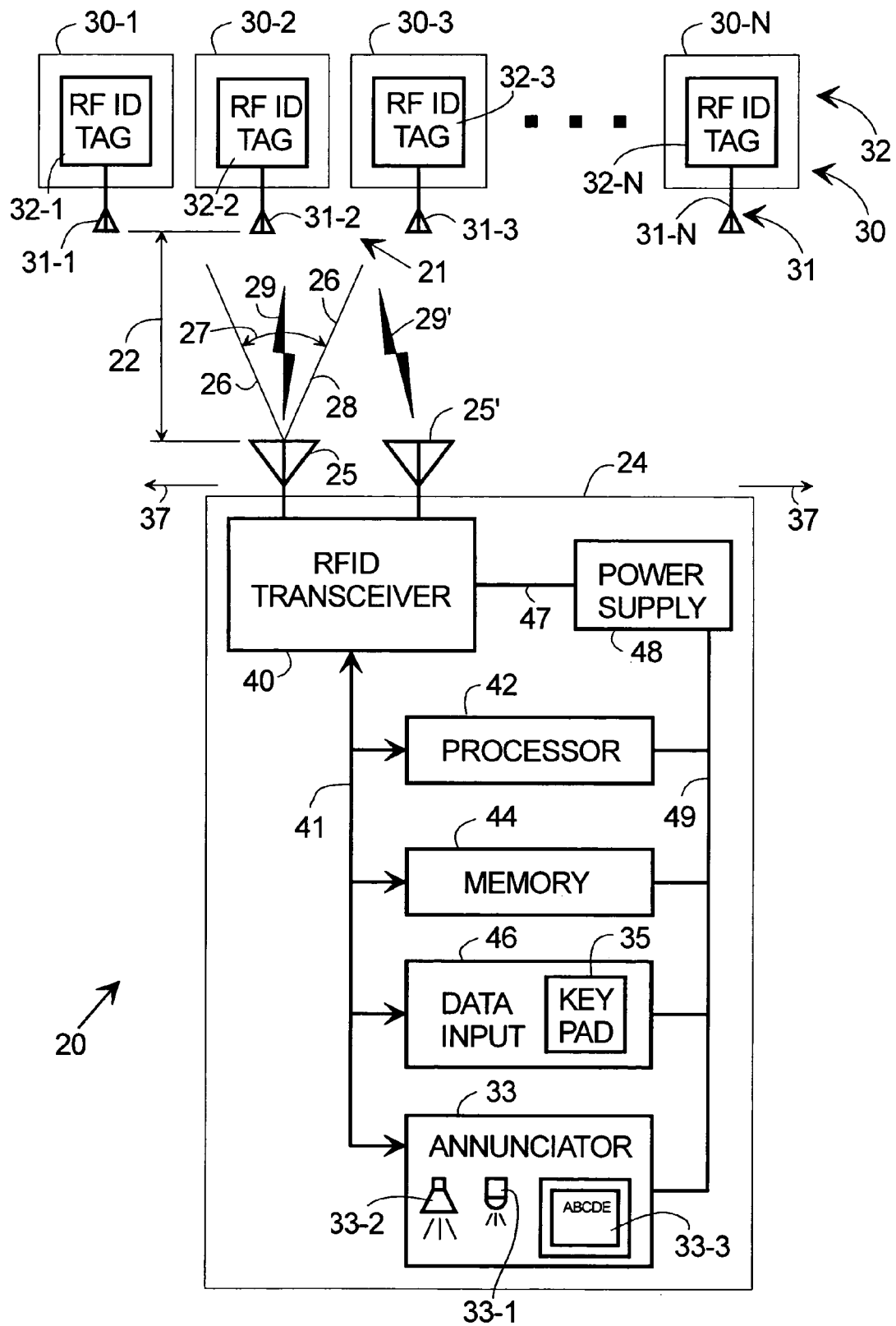
FIG. 2 is a simplified electrical block diagram of the item identification and locator system of FIGS. 1A–D according to the present invention, interacting with several RFID tagged objects or items.

FIG. 2 is a simplified electrical block diagram of item identification and locator system 20 of FIGS. 1A–D according to the present invention, interacting with several RFID tags 32 associated with several objects 30. In the example of FIG. 2, objects 30 comprise items or objects 30-1, 30-2, 30-3 . . . 30-N with associated RFID tags 32-1, 32-2, 32-3 . . . 32-N. Antennas 31-1, 31-2, 31-3 . . . 31-N associated with tags 32-1, 32-2, 32-3 . . . 32-N are also illustrated. Item identification and locator system 20 has antenna 25 that may handle both transmission of RF interrogation signal 29 and reception of tag response signal 29', or separate receiving antenna(s) 25' may be provided. Either or both arrangements are useful. For example, interrogator 24 may be provided with multiple antennas, where one or more serve different types of tags. Persons of skill in the art will understand which arrangement better suits their needs depending upon the types of tags 32 intended to be interrogated. Interrogator 24 is moveable with respect to objects 30 and tags 32 as indicated by arrows 22, 37. Distance or range 22 to objects 30 can be varied and lateral position with respect to objects 30 can also be varied as shown by arrows 37. Lateral position can be varied by translating or swinging interrogator 24 back and forth in front of objects 30 (and tags 32) so that beam pattern 26 intersects a different portion 21 of objects 30 and tags 32. As used herein the words "scan" or "scanning" or "sweep" or "sweeping", present or past tense, are intended to include all types of relative motion of interrogator 24 with respect to objects 30 and associated tags 32.

Interrogator 24 comprises RFID transceiver 40, processor 42, memory 44, data input 46, annunciator 33 and power supply 48. Transceiver 40, processor 42, memory 44, data input 46 and annunciator 33 are coupled and intercommunicate by bus or leads 41. Power supply 48 is coupled to transceiver 40 by power leads 47 and to processor 42, memory 44, data input 46 and annunciator 33 by power leads 49. It is desirable that power supply 48 be self-contained, as for example, using batteries, so that interrogator 24 is freely portable but this is not essential. Power supply 48 can be connected to external power mains by an extension cord (not shown), but this is less desirable since it limits the overall mobility of interrogator 24. In the preferred embodiment, interrogator 24 is powered by a battery. However, other types of portable energy sources can be used, for example and not intended to be limiting, a fuel cell, high-energy capacitor or a combination thereof. As used herein, the word "battery" is intended to include these and any other kind of portable power source of suitable voltage and current capacity.

The ID #(s) of the objects desired to be located are input by the user via data input 46, as for example, via key pad 35, but this is not essential. Any means of entering one or more ID #(s) for objects(s) desired to be located may be used. A non-limiting example of an alternate data input method is a touch pad and/or via a Bluetooth™ equipped portable data terminal. The entered ID #(s) are stored in memory 44 or equivalent. It is preferable that memory 44 contain non-volatile memory (as well as transient memory) for this and other purposes.

Once interrogator 24 is powered-up, RFID transceiver 40, desirably but not essentially acting under the direction of processor 42, broadcasts RFID interrogation signal 29 toward objects 30 and tags 32. Those of tags 32 that are within RF beam pattern perimeter 28 (the overall interrogator "field of view") will respond with signal 29'. It is desirable but not essential that transceiver 40 be capable of measuring at least the relative strength of received signals 29'. Signal 29 can be a repetitive signal so that a series of responses 29' is received by transceiver 40 from tags 32 within field of view 28. The received signals are referred to in the art as "hits" and include the unique identifier (e.g., the ID #) of the interrogated tags. Depending upon the relative RF signal strength at different locations, the relative position of interrogator 24 and tags 32 and the presence of any intervening items, interrogator 24 may or may not receive a hit each time interrogation signal 29 is sent out by interrogator 24. However, it is generally the case that the frequency of hits increases as interrogator 24 is brought closer to tags 32. Processor 42 receives the hits and compares the ID #'s received from tags 32 with ID #'s stored in memory 44, that is, with the ID #(s) of the one or more objects or items desired to be located and, optionally, with the ID#(s) previously received. When there is a match with the ID#(s) of the item(s) being sought, processor 42 causes a visual or audible and/or other signal to be emitted by annunciator 33. For example, light 33-1 may illuminate or flash, speaker 33-2 may emit a beep or tone (continuous or intermittent or frequency varying) and/or alpha-numeric display 33-3 may display the located ID #(s) or other alert message, or a vibrator (not shown) may alert the user, depending upon his or her needs. In the preferred embodiment, the signal (audible, visual and/or other) emitted by annunciator 33 is keyed to the hit rate and/or the signal strength of received RFID tag response 29'. Thus, the closer that interrogator 24 is to the object or item being looked for, the more rapid and/or the more intense the signals being emitted by annunciator 33. In this mode of operation, interrogator 24 functions in a manner analogous to a Geiger counter for detecting radiological material.

For example, when the object being sought is just barely within RF field of view 28 of interrogator 24, annunciator 33 beeps or flashes (or both) very slowly. By sweeping or scanning interrogator 24 back and forth and/or up and down or both over the pile or array of objects, the annunciator output may stop and start as the interrogator field of view excludes or includes the object(s) being sought. This tells the user the general direction or angle of bearing of the object(s) being sought. The user continues to sweep or scan interrogator 24 while moving toward the objects. As the distance between the interrogator and the object(s) being sought decreases, the annunciator output rate desirably increases. When interrogator 24 is close enough so that portion 21 of beam pattern 26 is directed primarily at the object being sought, the output of annunciator 33 is, preferably, substantially continuous. While this is the preferred mode of operation any form of annunciator operation that permits the user to determine when interrogator 24 is pointing substantially directly at the item being sought and not others, is useful. While other objects not being sought may also be within beam pattern 26 and are sending hits back to interrogator 24, they do not interfere with the locating function since they are ignored by processor 42 because their ID#'s do not match the sought-after ID#(s) stored in memory 44.

Figure 3:
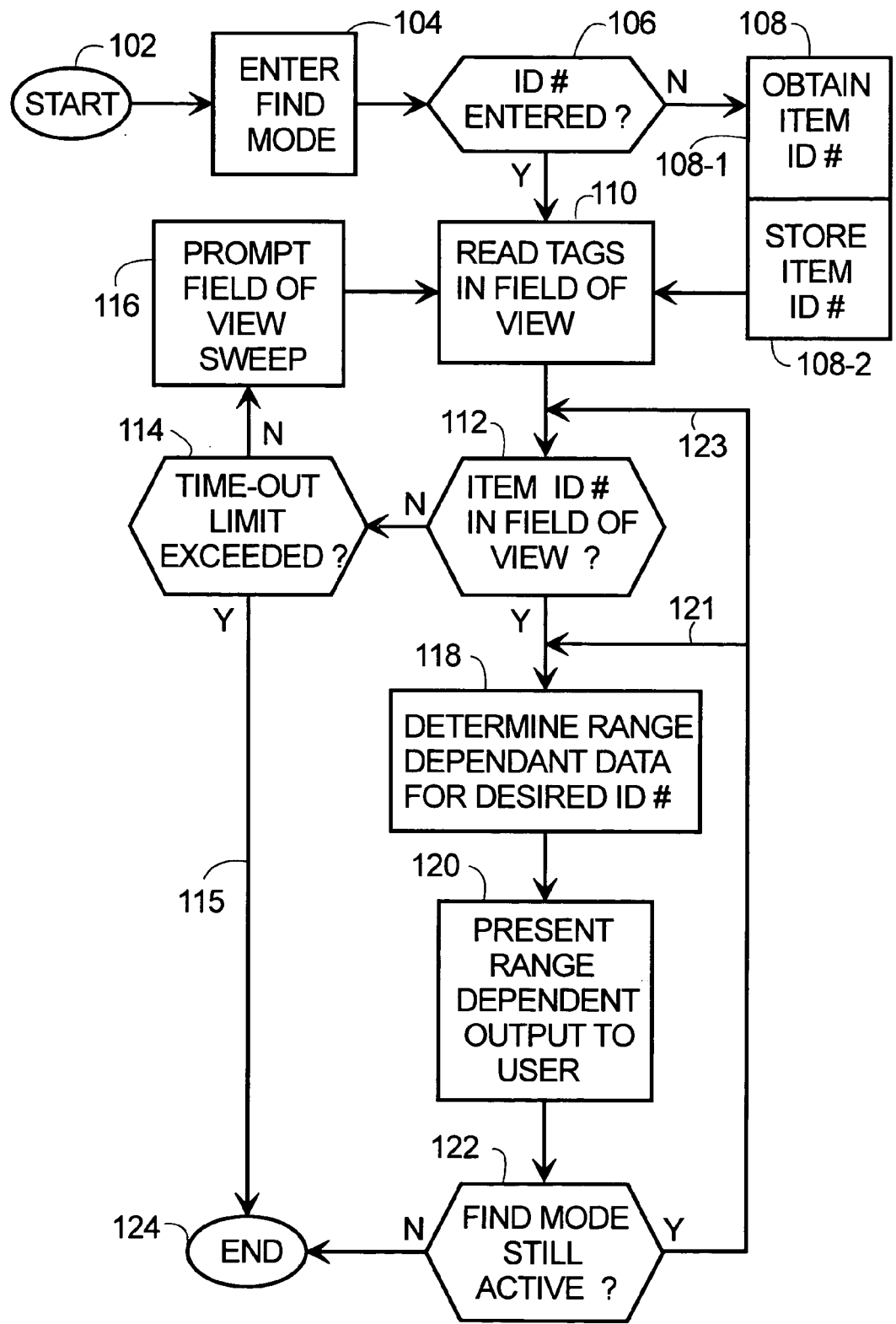
FIG. 3 is a simplified flow chart of the method of the present invention for remotely identifying and locating objects or items having ID tags thereon.

FIG. 3 is a simplified flow chart of method 100 of the present invention for identifying and locating items having RFID tags thereon. Method 100 begins with START 102 that desirably occurs on system power-up. System 20 may be capable of other functions beside the identify-and-locate (FIND MODE) function described herein. Hence optional ENTER FIND MODE step 104 is initially executed. Step 104 may be initiated by the user via data entry input module 46 or may occur automatically after a predetermined time interval or other default or maybe set by a simple switch (not shown). ID # ENTERED ? query 106 is then executed where it is determined whether or not the user has input (e.g., via keypad 35) a unique identifier. If the outcome of query 106 is NO (FALSE), abbreviated as "N", then method 100 executes OBTAIN and STORE ITEM ID # step 108, wherein the ID # is obtained in sub-step 108-1 and stored in sub-step 108-2. If the outcome of query 106 is YES (TRUE), abbreviated as "Y" or method 100 has proceeded via step 108, then step 110 is executed wherein those of tags 32 in field of view portion 21 are interrogated by signals 29 and their responses 29' received by RFID transceiver 40. ITEM ID # IN FIELD OF VIEW ? query 112 is then executed wherein it is determined whether the ID #s received from the various tags in field of view 21 match the stored tag ID #(s). If the outcome of query 112 is NO (FALSE), then optional TIME-OUT LIMIT EXCEEDED ? query 114 is executed wherein it is determined whether or not the time that has passed without a YES (TRUE) outcome of step 112 exceeds a predetermined value. If the outcome of query 114 is NO (FALSE) then method 100 proceeds to optional PROMPT FIELD OF VIEW SWEEP step 116. In optional step 116 the user is desirably prompted to make a different or further scan or sweep with interrogator 24. The prompt can be given by, for example, a visual message on output screen 33-3 or an audible announcement via speaker 33-2 (e.g., a voice message saying "scan other objects" or the like) or by a warning tone or a light output or a combination thereof by annunciator 33. READ TAGS step 110 is then repeated until query 112 yields a YES (TRUE) output or the TIME-OUT LIMIT in query 114 is exceeded. If the outcome of query 114 is YES (TRUE) indicating that the time-out limit has been exceeded, then as shown by path 115, method 100 optionally proceeds to END 124.

If the outcome of query 112 is YES (TRUE) indicating that the desired item ID # is in portion 21 of field of view 28 of interrogator 24, then OBTAIN RANGE DEPENDANT DATA FOR DESIRED ID# step 118 is desirably executed, wherein the proximity of the desired object is estimated from the returned signal hit rate and/or the returned signal strength or a combination thereof. In following step 120, the range dependant output data obtained in step 118 is presented to the user via annunciator 33, as has been previously described in connection with FIG. 2. For example and not intended to be limiting, the closer the object or item, the more rapid and/or intense the signals presented to the user by annunciator 33. Following step 116, FIND MODE STILL ACTIVE ? query 122 is executed wherein system 20 determines whether the FIND MODE is still set or switched on or whether it has been terminated by the user. If the outcome of query 122 is YES (TRUE) meaning that the FIND MODE is still active, then method 100 returns to step 118 as shown by path 121 or optionally returns to step 112 as shown by path 123. Either arrangement is useful. Steps 118, 120, 122 repeat so that the user is provided with further indication of the range and bearing of the desired object until the user shuts off the FIND MODE, whereupon query 122 yields (NO (FALSE) outcome and method 100 advances to END 124.

Figure 4:
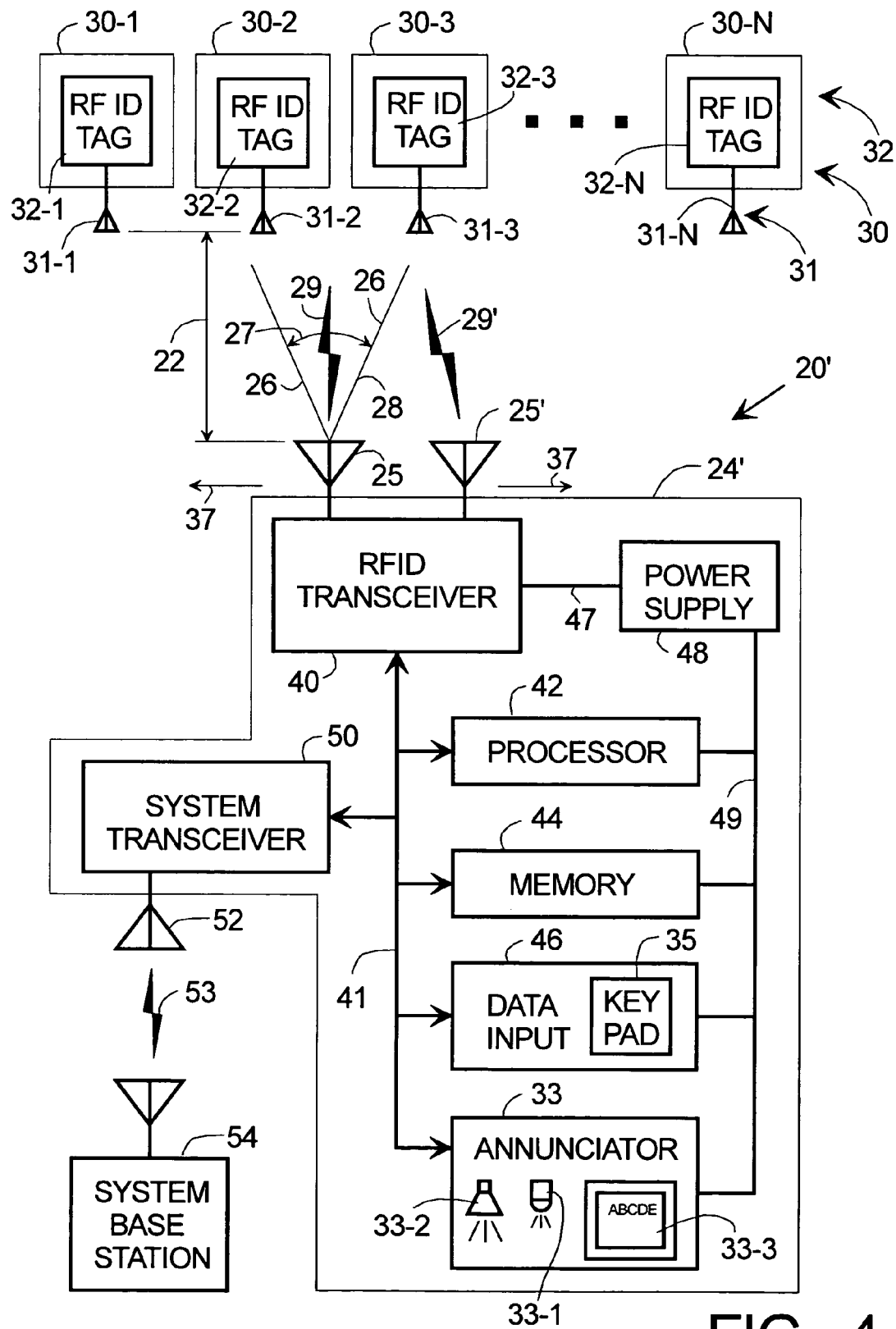
FIG. 4 is a simplified electrical block diagram of an item identification and locator system similar to that of FIG. 2 but according to a further embodiment.

FIG. 4 is a simplified electrical block diagram of item identification and locator system 20' similar to that of FIG. 2 but according to a further embodiment. Like reference numbers are used for like or analogous elements. System 20' differs from system 20 of FIG. 2 in that interrogator 24' of system 20' includes system transceiver 50 with antenna 52. System transceiver 50 is logically coupled to the other elements of interrogator 24' via bus 41. For convenience of description, the extension of power lead 49 to system transceiver 50 has been omitted in FIG. 4, but persons of skill in the art will understand that such power connection is needed. System transceiver 50 communicates with system base station 54 via wireless connection 53. Any appropriate signaling means may be used for wireless connection 53. Non-limiting examples are WiFi, 802.11, Bluetooth, Zigbee and so forth. The function of system transceiver 50 acting under the direction of processor 42, is to transmit to system base station 54 the ID#s of each tag newly identified by system 20'. This will be more fully understood in connection with the flow chart of FIG. 5 where system 20' is acting in a search mode or both a search mode and find mode.

Figure 5:
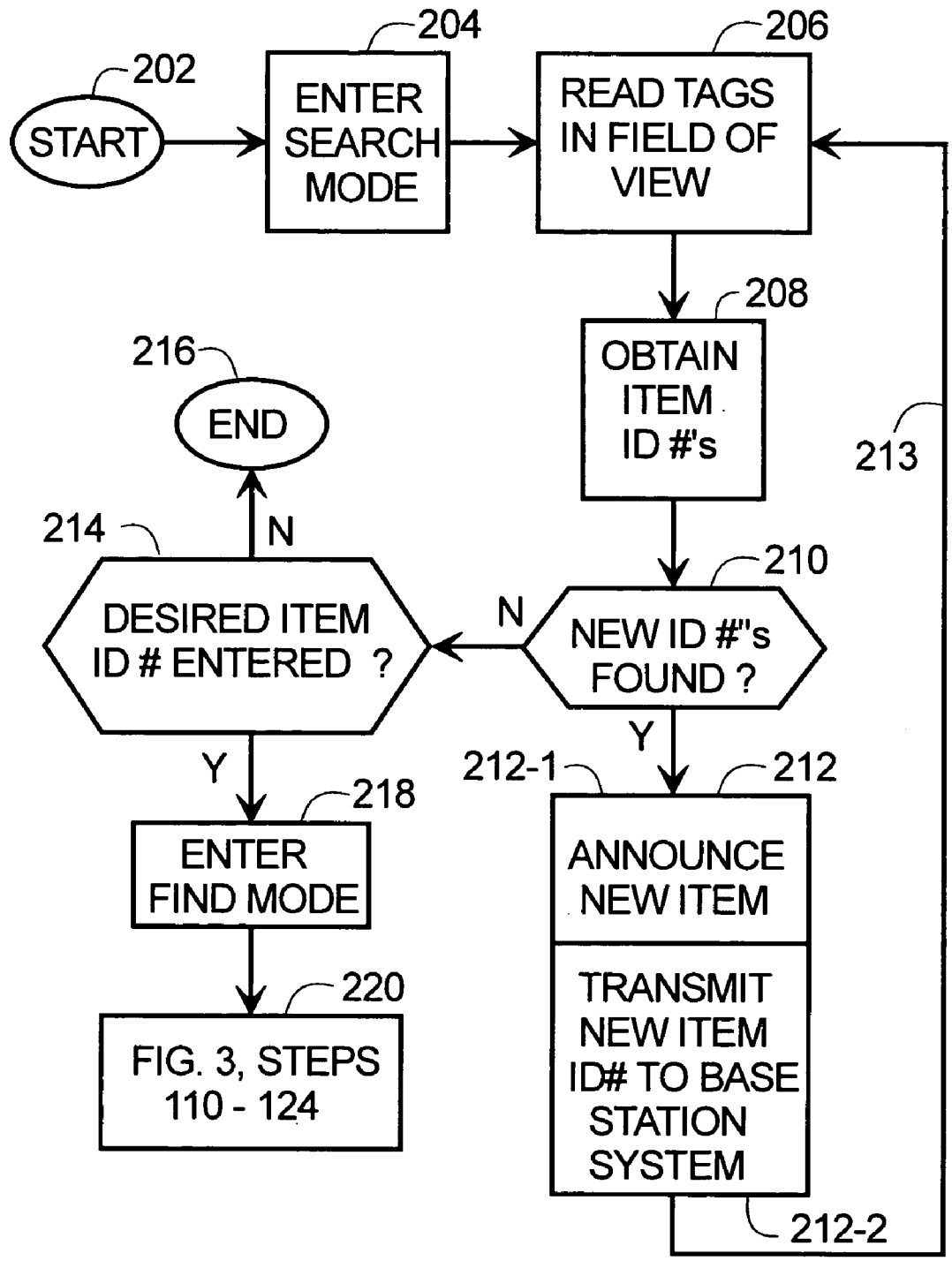
FIG. 5 is a simplified flow chart of the method of the present invention according to a further embodiment.

FIG. 5 is a simplified flow chart of method 200 of the present invention according to a further embodiment and adapted to be carried out by system 20' of FIG. 4. Method 200 begins with START 202 that desirably occurs on system power-up. System 20' is capable of other functions beside the identify and locate function described in connection with FIGS. 2–3, hence optional ENTER SEARCH MODE step 204 is initially executed. In subsequent step 206, all of the tags in the field of view of system 20' are interrogated and in step 208 their unique ID#s determined. It is desirable that such unique ID#s be temporarily stored in interrogator 24'. NEW ID #s FOUND ? query 210 is then executed wherein it is determined whether the ID#s identified in step 208 have been previously identified or not. If the outcome of query 210 is YES (TRUE), then method 200 proceeds to step 212 wherein, in either order, sub-step 212-1 is executed so that the appearance of a new item (e.g., new ID#) is announced to the user in some convenient manner (audibly, visually, and/or a combination thereof) and, optionally, sub-step 212-2 is executed such that the new item ID# is sent by system transceiver 50 to base station 52 over wireless link 53. In this way, base station system 52 accumulates a list of the items present in the field of view of interrogator 24'. This information is very useful since it allows base station system 52 to keep track of the items entering or leaving or remaining in a particular area. Following step 212, method 200 loops back to step 206 as shown by path 213, where the tags in the field of view are re-interrogated and steps 208–212 repeated until no new tags are detected.

For example, in carrying out steps 206–212 processor 42 causes annunciator 33 to provide an output while the unknown tags are being scanned, e.g., one beep or flash or other indication for each new tag being detected. When all of the tags have been scanned without finding further new items (further new tags), step 210 yields NO (FALSE)) and processor 42 desirably shuts off the output of annunciator 33, thereby alerting the user that the scan is complete and that all new items (tags) have been identified.

If the outcome of query 210 is NO (FALSE) indicating that no new items are detected, then method 200 optionally proceeds to DESIRED ITEM ID# ENTERED ? query 214 wherein it is determined whether or not the ID# of a desired item has been entered into system 20'. In other words, method 200 and system 20' tests to see whether the user desires to automatically enter the FIND mode discussed in connection with FIG. 3. If the outcome of query 214 is NO (FALSE) then method 200 proceeds to END 216. If the outcome of query 214 is YES (TRUE) meaning that the user has already entered the ID# of an item desired to be located, then method 200 can automatically enter the FIND mode as shown in step 218. Subsequent to step 218 then, as shown by block 220, method 200 executes steps 110–124 of method 100 of FIG. 3, wherein the user is able to locate the desired item. In a further embodiment, an additional query can be executed before or after step 218 wherein interrogator 24' checks the desired ID# against the detected ID#s found in step 208 to see whether the desired ID# is present among the already scanned items and announce such to the user, but this is not essential.

The present invention has been described for an antenna that has a beam pattern that is spatially limited in both elevation and azimuth. This preferred but not essential. If the interrogator has a beam pattern that is spatially limited even in only one dimension, the user can make use of this to obtain both azimuth and elevation angle information by rotating the interrogator ninety degrees.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An item locating system comprising:
    a portable communication system for interrogating an initially unknown item and receiving responses therefrom that depend upon the angle of bearing of the initially unknown item;
    a comparator coupled to the communication system for comparing the received responses with a unique identifier for the item desired to be located; and
    an annunciator coupled to the communication system and the comparator for indicating whether the communication system is approximately directed along the angle of bearing.

2. The locating system of claim 1 further comprising a directional antenna coupled to the communication system for interrogating the item, wherein a spatially limited beam pattern of the antenna provides an indication of the angle of bearing of the particular item.

3. The locating system of claim 2 wherein the annunciator provides audible signals whose repetition rate depends upon the proximity of the item.

4. The locating system of claim 3 wherein the repetition rate of the audible signals increases as the directional antenna approaches the item.

5. The locating system of claim 3 wherein the repetition rate of the audible signals increases as the directional antenna points toward the item and decreases as the directional antenna points in other directions.

6. The locating system of claim 2 wherein output of the annunciator increases as the directional antenna points toward the item and decreases as the directional antenna points in other directions.

7. The locating system of claim 2 wherein the directional antenna has a principal lobe in a direction toward the item to be located.

8. The location system of claim 7 wherein the principal antenna lobe is limited in both azimuth and elevation.

9. The locating system of claim 1 wherein the item provides responses in the form of RF signaling packets comprising an identifier unique to the item.

10. The locating system of claim 9 wherein the annunciator gives an indication of the time rate of receipt of the RF signaling packets.

11. A system for locating an item having an RFID tag with a unique identifier, comprising:
    an annunciator for providing item location information to a system user;
    a data input for entering the unique identifier;
    a memory coupled to the data input for storing the unique identifier;
    one or more antennas for transmitting interrogation signals to the RFID tag and receiving responses from the RFID tag, wherein at least one of the one or more antennas is directional so as to have a field of view that is spatially limited in azimuth or elevation and range;
    an RFID tag interrogator coupled to the one or more antennas, wherein the interrogator is adapted to transmit an RFID tag interrogation signal to and receive a response from the RFID tag by means of the one or more antennas, wherein the response includes an identifier for the RFID tag providing the response;
    a processor coupled to the annunciator, the data input, the memory and the interrogator, wherein the processor compares the RFID tag identifier received by the interrogator to the unique identifier stored in the memory and if they match, causes the annunciator to emit a user alert signal dependant on the proximity to the interrogator of the RFID tag providing the matching response.

12. The system of claim 11 further adapted to receive an on-board power source so that the system is portable.

13. The system of claim 11 wherein the interrogator provides a range related signal to the processor, the range related signal depending on the signal strength or repetition rate or both of the responses received from the RFID tag, and wherein the user alert emitted by the annunciator is derived by the processor from such range related signal.

14. A method of locating a particular item from among a plurality of items, using an RFID tag interrogator, wherein each item has thereon an RFID) tag containing a unique identifier, comprising:
    obtaining and storing the unique identifier for the particular item desired to be located;
    interrogating the tags of the plurality of items to determine their unique identifiers;
    comparing the unique identifiers obtained from the plurality of items to the stored unique identifier for the particular item desired to be located and, if there is a match,
    presenting to a user relative position dependant data for the tag having the unique identifier for the particular item desired to be located; and
    repeating the interrogating, comparing and presenting steps for different locations of the interrogator, thereby obtaining position dependant data pointing to the particular item.

15. The method of claim 14 wherein the position dependant data has a repetition rate or intensity or both that increases as the distance between the particular item and interrogator decreases.

16. The method of claim 15 wherein the repeating step comprises moving the interrogator in a direction corresponding to increases in repetition rate or intensity of the position dependant data.

17. The method of claim 14 wherein the interrogating step comprises interrogating those of the plurality of items that are within an RF field of view of the interrogator.

18. The method of claim 14 wherein the interrogating step comprises interrogating the plurality of items using a directional antenna.

19. The method of claim 14 further comprising:
    prior to the interrogating step, setting an annunciator to provide an alert output the first time a response is received from a tag being interrogated; and
    if there is no match in the comparing step, then shutting off the annunciator.

20. The method of claim 19 further comprising after the setting step, if there is a match in the comparing step, switching the annunciator to the presenting step.

21. A method by which a user can identify items containing RFID tags using a tag interrogator, comprising:
   interrogating the RFID tags in the field of view of the interrogator;
   obtaining the ID#s associated with the read tags;
   determining whether new ID#s have been obtained and if so,
   providing an announcement to the user for each new ID#, and
   repeating the interrogating, obtaining, determining and providing steps until no new ID#s are obtained.

22. The method of claim 21 Anther comprising wirelessly transmitting the ID#s obtained to a system base station.

23. The method of claim 21 wherein the providing step comprises providing an audible announcement to the user substantially only for each new tag ID# obtained, said audible announcement ceasing when no further new tag ID#s are obtained.

24. The method of claim 21 further comprising after the repeating step:
   determining whether the unique ID# of an item desired to be located has been entered by the user, and if so,
   presenting range and bearing information concerning the item desired to be found to the user.

25. The method of claim 24 wherein, when the outcome of the step of determining whether the unique ID# has been entered is NO (FALSE), proceeding to END the method.

* * * * *

UNITED STATES PATENT AND TRADEMARK OFFICE
CERTIFICATE OF CORRECTION

| | | |
|---|---|---|
| PATENT NO. | : 7,142,120 B2 | Page 1 of 1 |
| APPLICATION NO. | : 10/881020 | |
| DATED | : November 28, 2006 | |
| INVENTOR(S) | : Hal Charych et al. | |

It is certified that error appears in the above-identified patent and that said Letters Patent is hereby corrected as shown below:

In Claim 14, column 10, line 31, delete "RFID)" and insert --RFID--.

Signed and Sealed this

Twenty-seventh Day of February, 2007

JON W. DUDAS
*Director of the United States Patent and Trademark Office*